United States Patent [19]
Howard et al.

[11] 3,718,927
[45] Feb. 27, 1973

[54] AUTOMATIC DIGITAL ERROR DETECTOR FOR RADAR RANGE TRACKING

[75] Inventors: Dean D. Howard; David C. Cross, both of Oxon Hill, Md.

[73] Assignee: The United States of America as represented by the Secretary of the Navy

[22] Filed: April 23, 1971

[21] Appl. No.: 136,946

[52] U.S. Cl. .................343/7.4, 343/5 DP, 343/7.3, 343/16 M

[51] Int. Cl. .................................................G01s 9/22

[58] Field of Search ............343/5 DP, 7.3, 7.4, 16 M

[56] References Cited

UNITED STATES PATENTS

| 3,166,745 | 1/1965 | Engledew et al. | 343/7.4 |
| 3,487,405 | 12/1969 | Molho et al. | 343/5 DP X |
| 3,550,126 | 12/1970 | Van Hijfte et al. | 343/16 M |
| 3,646,588 | 2/1972 | Van Popta | 343/7.3 |

Primary Examiner—Malcolm F. Hubler
Attorney—R. S. Sciascia, Arthur L. Branning and P. Schneider

[57] ABSTRACT

This invention pertains to a new method of obtaining range, AGC and angle tracking error voltages employing digital methods of processing the receiver output of high range resolution monopulse tracking radars to generate these signals.

4 Claims, 5 Drawing Figures

INVENTORS
DEAN D. HOWARD
DAVID C. CROSS

ATTORNEY

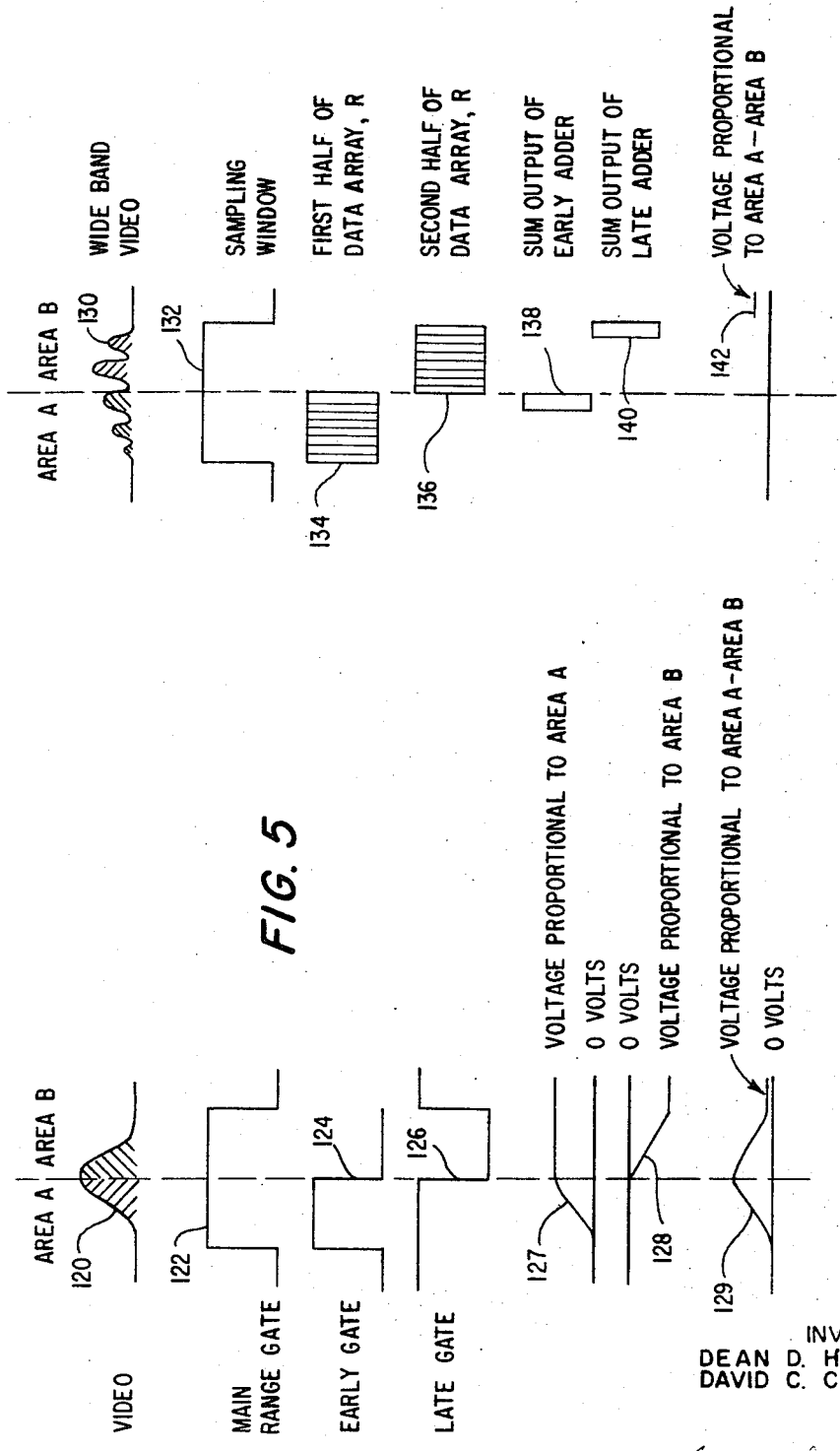

AUTOMATIC DIGITAL ERROR DETECTOR FOR RADAR RANGE TRACKING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Radars used in target tracking are continuously measuring the delay between the RF pulse transmission and the receipt of the echo returned from the target and relative angle between the target and the antenna axis. A range tracker is usually used to obtain this delay information and to position the range and angle error detectors about the target. Many of the range trackers employ early-late or split gate range error sensing circuits which attempt to divide the target area into two equal areas which bracket the target in equal amounts. When either the early or late portion of the target echo received is greater in one gate than in the other gate, an error output is produced which is used to reposition the early and late gates in time in order that the next range and angle error measurement will be made about the target. This system of early and late gates is simple and efficient for operation with conventional pulse lengths of 0.1 microseconds or greater. However, with the advancing state-of-the art making high range resolution monopulse practical with very short pulse lengths, short compared to target length, on the order of a nanosecond, the analog approach of the early-late gate became more complex. High range resolution tracking radar will typically employ rapid sampling techniques thereby lending itself to digital processing techniques.

SUMMARY OF THE INVENTION

The general purpose of this invention is to provide a range tracker for a monopulse tracking radar which uses digital sampling and processing techniques to produce the range and angle error signals which are used in tracking control and an automatic gain control signal (AGC). The invention includes a high speed sample and hold circuit which divides the wide band video into a number of sampled segments each of which stores a portion of the wideband target video. This stored information is analyzed by a digital processor to determine the range, AGC and angle error voltages; and provide a digital or analog output representative of the targets change in position since the last stored range, the amount of angle error, and an AGC signal. The range error output is used to correct the last stored range position while the angle output is used to direct the antenna toward the target.

OBJECTS OF THE INVENTION

It is therefore an object of the invention to provide an improved range tracker for monopulse radar.

Another object is to provide an improved angle error detector for monopulse radar.

Yet another object is to employ digital processing techniques to process the range and angle wideband video and produce an output which is an indication of the range error, an average amplitude of the received signal and the angle error for use in a monopulse radar.

DESCRIPTION OF THE DRAWINGS

FIG. 5 shows a comparison of the digital techniques with conventional early-late gate range tracking.

DESCRIPTION OF THE PREFERRED EMBODIMENT

Before proceeding with the description of the present invention, it is considered advisable to discuss some basic concepts of tracking radars. Tracking radars are used principally for continuously measuring the position of a target in range, azimuth angle and elevation angle. These radars typically consist of an antenna, which radiates a pencil-beam, from a rotating platform which is controlled in azimuth and elevation position by angular error signals which cause the antenna to change position keeping the target centered in the beam. These radars would typically employ a display which shows a target as a single point source of brightness on a CRT usually indicating the range; range and azimuth; or range, azimuth and elevation of the target depending on the type of display.

The accurate tracking of a target, when less highly resolved range and high resolved angular position are employed, is complicated by angle noise (also called glint or scintillation), which causes the angular location of an apparent source to wander back and forth about the long time average radar center of the target, due to echo signal from a complex target being dependent upon the relative phase and amplitude of the component echo signals and the relative angular locations. This long time average radar center is herein called the true center of the target.

Figure 1:
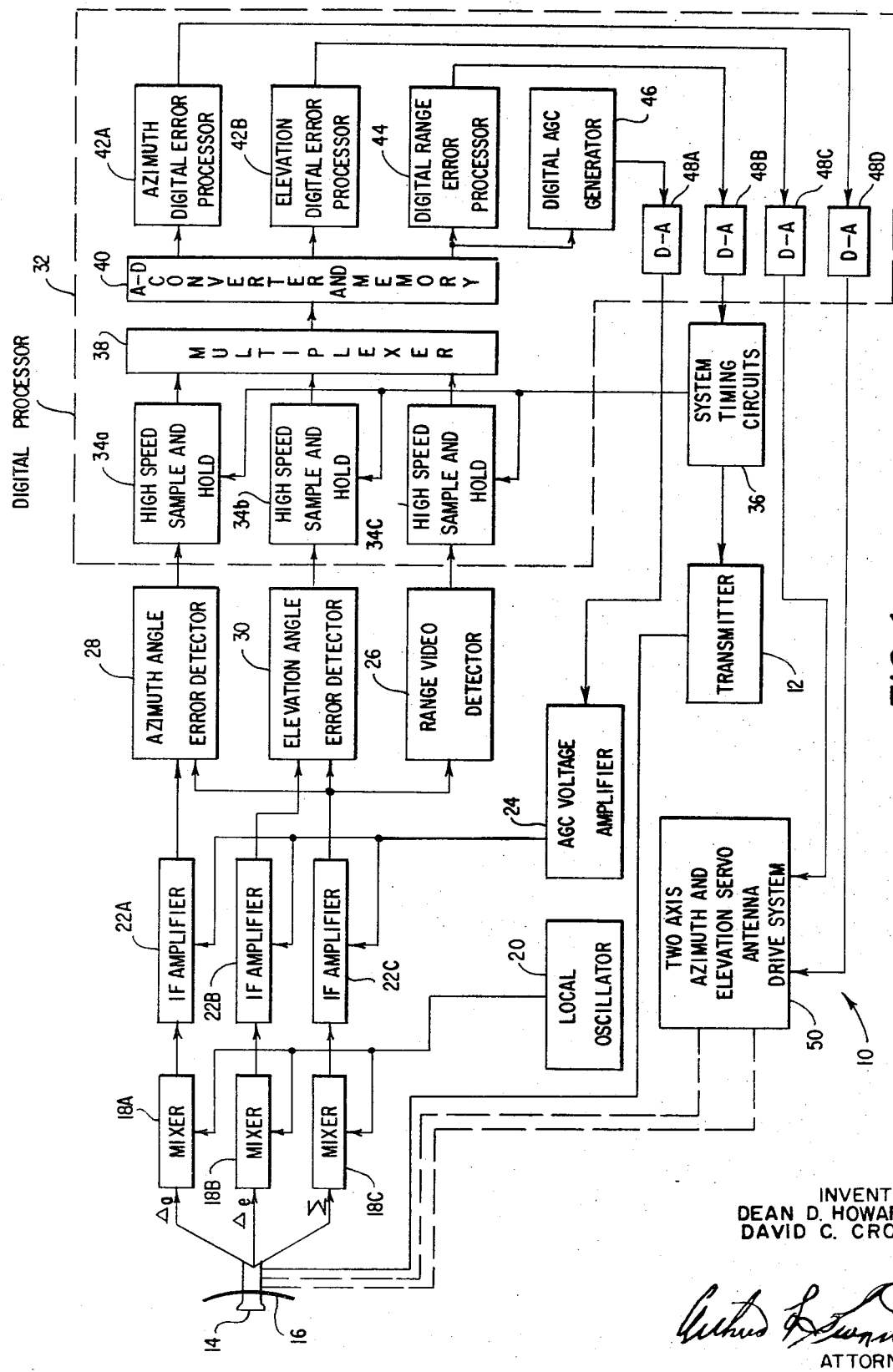
FIG. 1 shows the preferred embodiment of the invention.

The present invention employs highly resolved range and wide bandwidth angular error information which is supplied to the range tracking section of the radar wherein the range error is detected, the timing circuits of the radar are adjusted for the new range, and the angle error outputs are supplied to a two axis servo system which drives the antenna. Now referring to FIG. 1 which is conventional monopulse tracking radar wherein the digital processor in essence replaces the "box-car" circuits. These "box-car" circuits are normally used in the azimuth, elevation, AGC generator, and range error detector. Again referring to FIG. 1, the overall monopulse tracking radar is shown as 10. A transmitter 12 supplies a short pulse, on the order of a few nanoseconds, to the feed horn 14 of a cassegrain antenna 16. The RF signal reflected from the target is received by feed horn 14 which produces a summation output coupled to mixer 18C, an elevation difference output coupled to mixer 18B and an azimuth difference output coupled to mixer 18A. Local oscillator 20 is connected to mixers 18A, B and C. Mixers 18A, B and C are connected to IF amplifiers 22A, B and C, respectively. The gain of the IF amplifiers 22A, B and C is controlled by AGC voltage amplifier 24 which receives information from the range video detector 26, which may be an amplitude detector. The output from IF amplifier 22C is also connected to azimuth and elevation angle error detectors 28 and 30 which may be phase sensitive detectors. IF amplifier 22B supplies elevation difference information to error detector 30; and amplifier 22A is coupled to detector 28. The output of the range video detector 26 is a unipolar wide range video, (see FIG. 3). While the output from the angle detectors 28 and 30 are bipolar video, (see FIG. 4), giving indications of the angular error from the boresight axis of the antenna. The outputs of error detectors 26, 28 and 30 are coupled to the digital processor 32. Each of the detectors is connected to a separate high speed sample and hold circuit 34A, B and C. These circuits 34A, B and C are controlled by the system timing circuits 36 which produce a pulse to start the sample and hold circuits just before a target echo is expected. Sample and hold circuits 34A, B and C are connected to multiplexer 38, the output of which is coupled to A and D converter and memory storage unit 40. The stored memory information is supplied to azimuth and elevation digital error processors 42A and B which are similar in nature. Range information is applied to the digital range error processor 44 and digital AGC generator 46. The output of the azimuth digital error processor 42A is supplied to D to A converter 48D which controls the azimuth servo drive portion of the antenna drive system 50. The elevation digital error processor 42B supplies an output to the D to A converter 48C which controls the elevation portion of the antenna drive system 50. The digital range error processor 44 is an output representative of the range error coupled to the D to A converter 48B. The analog output of the converter 48B controls the system timing circuits 36 which control the time at which a pulse is generated to the sample and hold circuits 34A, B and C. When a signal is received by the system timing circuits 36 indicative of an increase in range, the timing circuits delay the start pulse to the sample and hold circuits 34 by the increased amount indicated by range error processor 44. The system timing circuits also supply a trigger to the transmitter to generate the RF pulse. This is independent of the timing signal to the sample and hold circuits while the sample and hold circuits are delayed with respect to this trigger pulse. The output of the digital AGC generator 46 is coupled through D to A converter 48A to the AGC voltage amplifier 24 to control the gain of the IF amplifiers 22. Thus, FIG. 1 shows the overall preferred embodiment of the invention.

Figure 3:
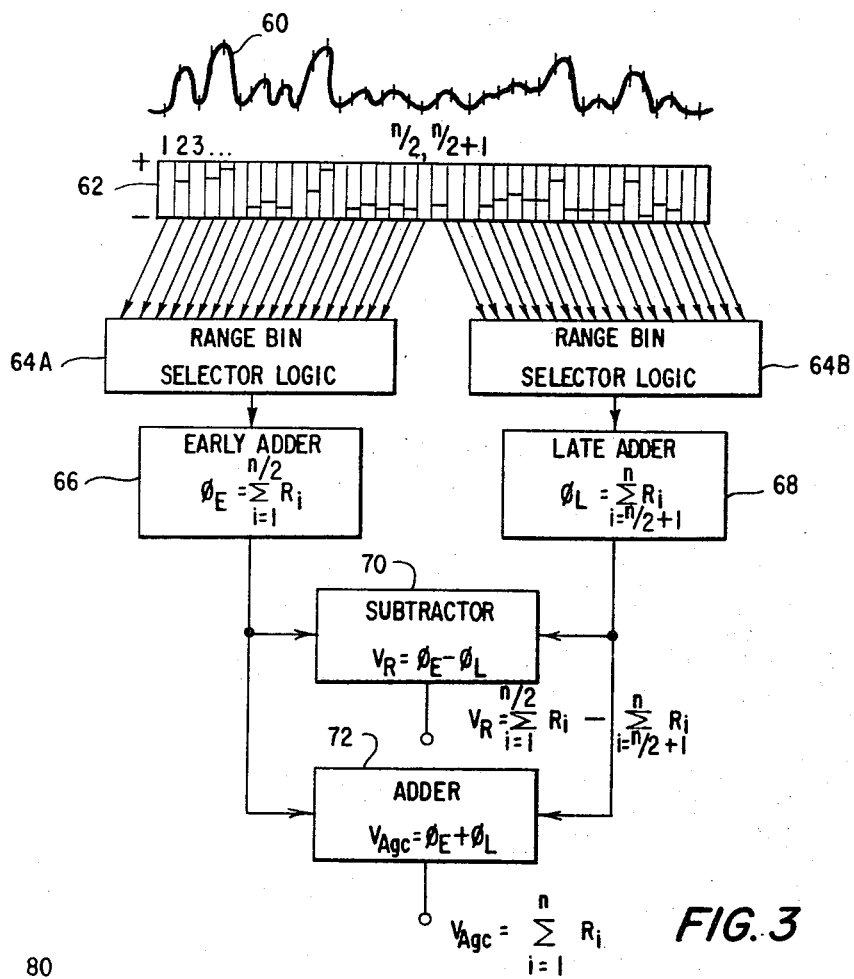
FIG. 3 shows a flow chart of the processing techniques for range error and AGC.

Now referring to the operation of the digital processor in determining the range error and AGC voltages necessary for tracking, FIG. 3 shows a flow chart of the processing techniques for the $V_R$ and $V_{AGC}$ voltages. The invention requires that the envelope of the target return or echo, shown in FIG. 3 as wideband video return 60, be sampled and stored in a digital format. As the video need only be sampled in the vicinity of the target, the range tracking system of the radar will provide a gate to start the sampling in the proper area. The samplers 34A, B and C may be of a type similar to those used in sampling oscilloscopes. An even number of samples, $n$, should be taken at intervals at least as small as the resolution cell of the radar and the size of the target. For example, if the resolution cell is 1 foot and the size of the target is a 120 foot aircraft, $n$ should be greater than 120. The size of $n$ would of course be controlled by programming the digital processor and determined by the size of the target. After the range video has been sampled, there is an array of stored data, R, of size $n$ available for processing. The stored data 1 through $n$ is shown in FIG. 3 as 62 thus giving a representation of the digital values for particular points on the wideband video return 60, the sampling point being indicated as dots on the wideband video 60. To develop the range error voltage $V_R$ the data is processed by summing the first $n/2$ samples, $\phi_E$, and the last $n/2$ samples, $\phi_L$, from R, the stored data array. The difference of these two sums $\phi_E - \phi_L$ will be the range error voltage, $V_R$, which represents the error in centering the $n$ samples of R about the center of the target.

Part of the function of digital range tracker will be to generate an AGC voltage, $V_{AGC}$, proportional to the average amplitude of the echo signal. This is used as a conventional automatic gain control in the IF amplifiers 22 to keep a constant average angle sensitivity for stable closed loop tracking. To perform the generation of the $V_{AGC}$, a digital range error detector processor 44 and 46 in FIG. 1 performs an additional step. As described above it subtracts the output from its summation of cells 1 through $n/2$ and its summation of the cells $n/2$ plus 1 to $n$ to obtain range error. To obtain $V_{AGC}$ the number proportional to average amplitude it adds these two summations.

$$V_{AGC} = \sum_{i=1}^{n} R_i = \sum_{i=1}^{n/2} R_i + \sum_{i=\frac{n}{2}+1}^{n} R_i = \phi_E + \phi_L$$

Although the AGC process keeps the angle sensitivity constant for the overall target the sensitivity within each resolution cell can fluctuate so that the angle video voltage in each cell is equal to the product of $A_i$ the amplitude of the echo within the $i^{th}$ resolution cell and $\theta_i$ in the actual angular displacement of the part of the target within the cell from the antenna axis. The resultant processed high range resolution angle error voltage is equal to the summation $$\sum_{i=1}^{n} A_i \theta_i;$$

when there is no AGC. However, a normal AGC function effectively divides the error voltage by $$\sum_{i=1}^{n} A_i$$

to maintain constant average angle sensitivity giving a resultant angle error voltage $V_A$ $$V_A = \frac{\sum_{i=1}^{n} A_i \theta_i}{\sum_{i=1}^{n} A_i}$$

This by definition is the true center of the target. In FIG. 3 it is seen that the data array R 62 is divided into two equal segments, one segment is summed from $i = 1$ to $n/2$ while the second segment $n/2 + 1$ is summed to $n$. These individual segments are subtracted from each other to obtain range error video while when added together they produce an AGC voltage. Again referring to FIG. 3 the early segment of data is stored and then presented to a range bin selector section 64A and the late section is supplied to range bin selector section 64B. These outputs are summed in early adder 66 and the late adder 68, whose outputs are supplied one to a range voltage error output subtractor 70 and also to an adder 72 which supplies the AGC voltage.

Figure 4:
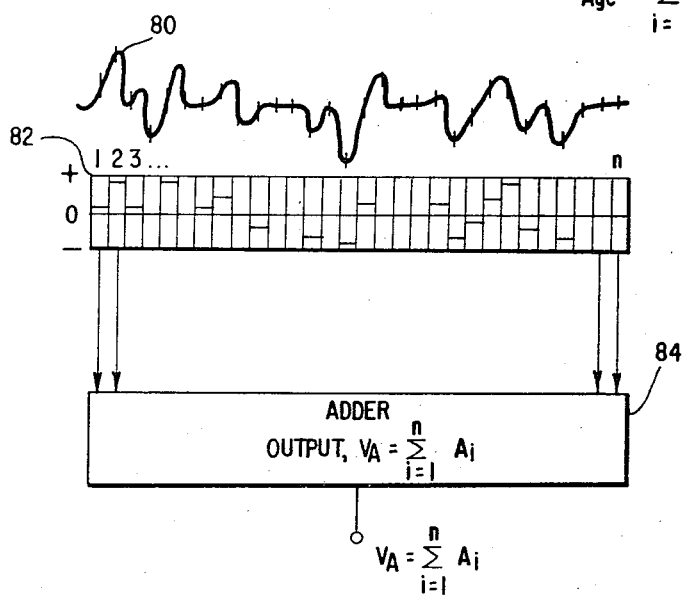
FIG. 4 shows a flow chart of the processing technique for either the azimuth or elevation error.

Referring now to the digital error processing technique of one angle, in this case the azimuth, angle wideband azimuth video return is shown in FIG. 4 as bipolar wide range video 80. This azimuth video is sampled and stored. A graphic representation 82 shows the bipolar sample and storage points at various time intervals, dots on line, of the amplitude of the wideband at video return 80. This stored information is supplied to an adder 84 which adds the sum of the $A_i$ element from 1 through $n$ thereby producing a digital average of the angular data obtained a positive or negative voltage being indicative of the angle error of the antenna axis in azimuth. Of course the elevation portion of the processor will be the same as the azimuth portion.

One purpose of using high range resolution monopulse tracking radar is to reduce the target angle scintillation. The scintillation is caused by intermodulation between the parts of the targets. The high range resolution technique resolves targets into many parts and measures the precise angle of each part such that by means of being resolved they cannot intermodulate. The angle of each resolved part of the target relative to the antenna axis is indicated by a bipolar video voltage. The video amplitude is proportional to the angular displacement of the part of the target from the antenna axis, the polarity indicates the direction such azimuth right or left error indicated by a positive or a negative voltage respectively. Of course this digital weighted average which is the output of adder 84 is supplied to a digital to analog converter which supplies an analog output to control the antenna. This would be the case in both the elevation and azimuth servo loops. The processing of the elevation error signal $V_E$ would be defined as follows:

$$V_E = \sum_{i=1}^{n} E_i.$$

where $E_i$ is the $i^{th}$ element of an array $E$. The array, $E$, is array representing a collection of samples taken from the wideband elevation video return just as array, $A$, represents the azimuth video, as shown above.

Figure 2:
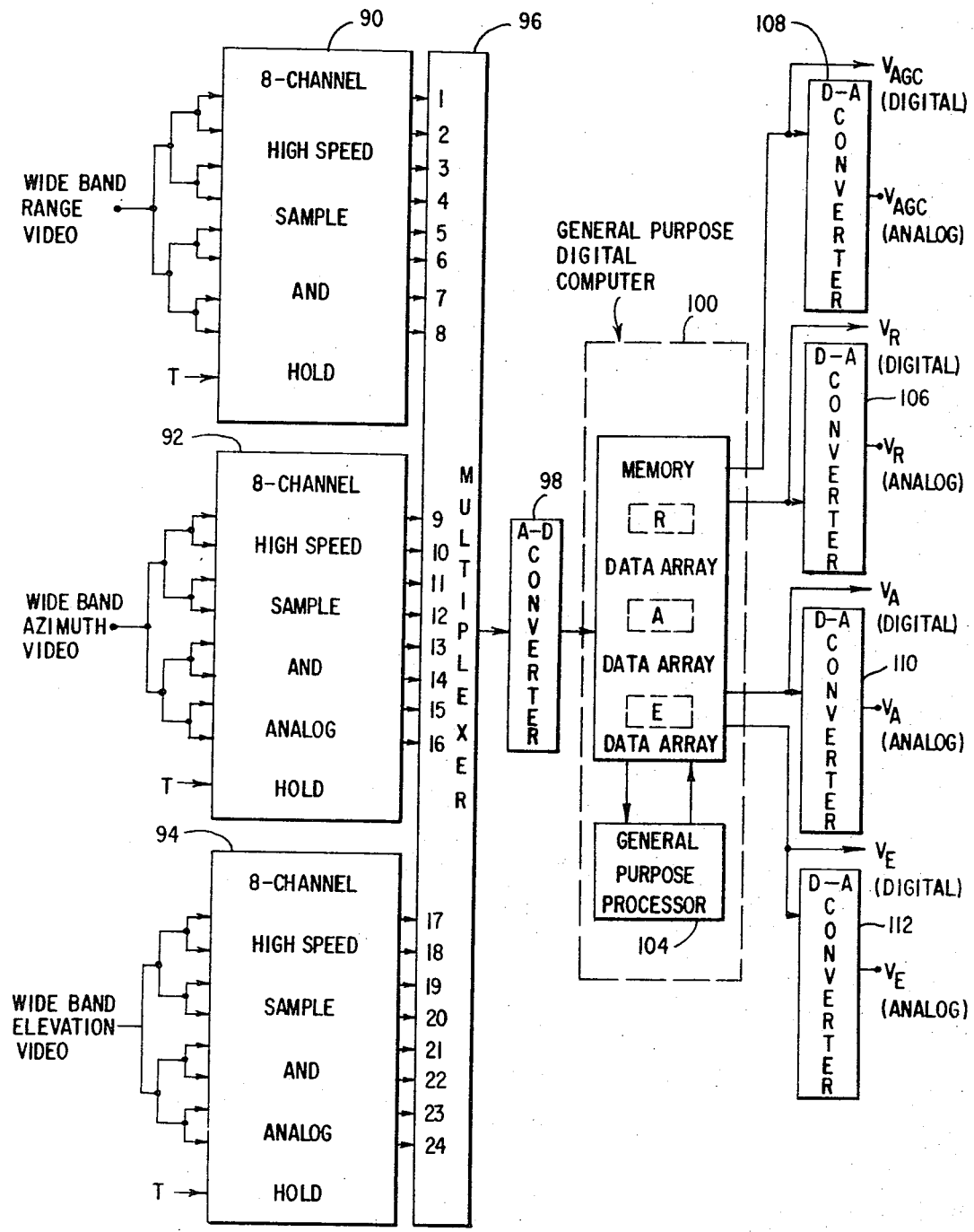
FIG. 2 shows the error detection circuitry of the preferred embodiment.

Referring now to FIG. 2, a more detailed diagram of the digital processor 32 of FIG. 1, it is seen that the wideband range video is supplied to an 8 channel high speed sample and hold circuit 90. The sampling circuit 90 is triggered by a trigger shown as T which would normally be supplied by the system timing circuits 36 of FIG. 1. Like the sample and hold circuit 90 the azimuth video is supplied to sample and hold circuit 92 and the elevation video is supplied to sample and hold circuit 94. The outputs of all three of these are in turn supplied to a multiplexer 96. This multiplexer 96 in time supplies each of the sampled signals to an A to D converter 98 which converts the analog signals level to digital signals which are stored in the general digital computer 100 a portion of the digital processor. Converter 98 supplies the signal to the general purpose computer 100 which is comprised of a memory 102 and general purpose processor 104. These components combine to operate on signals in the manner described above. The $V_R$ range error signal output is supplied to a D to A converter 106. The $V_{AGC}$ output is supplied to a D to A converter 108 and the analog outputs for the $V_A$ and $V_E$ error signals are supplied by D to A converters 110 and 112, respectively. As shown in FIG. 2, should the equipment be able to use the digital outputs this could be used directly by a particular portion of the radar system for control.

Now referring to FIG. 5, which is a comparison of the digital technique of the invention with the conventional split gate or early-late gate range tracking system. Looking to the split gate range tracking, for purposes of discussion a single video pulse is shown as 120 being equally distributed on either side of a center line. Thus we have equal areas, area A and area B. The normal range gate system would have a main range gate approximately centered on the video return. This is shown as gate 122. This gate causes the generation of an early gate for the first half and a late gate for the second half of the main gate. These early and late gates allow a portion of the range video 120 to charge on the early gate to a certain potential and then is discharged to a second potential by the late gate. The difference between these potentials is the error range output which is used to correct the trigger initiating range gate 122. Now referring to the digital portion, an area is divided into two areas A and B of equal amount and a wideband video 130 of a monopulse radar is shown. This is approximately centered in a sampling window 32. During the first half of the sampling window, the first portion of data array R is sampled and stored. The second half of the window samples and stores the remainder of the data array R. This data is digitally summed separately and then the difference between the two sums is calculated. Therefore a voltage proportional to the difference between area A and area B may be generated which is the range error signal. This signal may be used to adjust the trigger initiating the sampling window 132 such that it is centered at the true center of the wideband video when received.

Thus it is seen from what is described here is a new radar tracking system which employs digital processing to obtain range error signal, automatic gain control signal, azimuth error signal and elevation error signal. Thus the radar is able to reduce target angle scintillation. The major advantage of the invention described is to allow a tracking radar to track the true center of a target greatly reducing target scintillation. This is possible since a target is composed of multiple reflectors and this invention allows the radar to track the centroid of the many reflectors weighed by the amplitude of each instead of tracking the target as if it were a single reflected element.

Obviously many modifications and variations of the present invention are possible in the light of the above teachings. It is therefore understood that within the scope of the appended claims, the invention may be practiced otherwise than as specifically described.

What is claimed and desired to be secured by Letters Patent of the United States is:

1. A radar tracking system which employs digital processing techniques in target tracking:
    antenna means functioning to provide, first, second and third signals;
    said first signal being indicative of target range;
    said second signal being indicative of target azimuth angular error from the boresight of said antenna;
    said third signal being indicative of target elevation angular error from the boresight of said antenna;
    means for digitizing the analog information of said first, second and third signals and for forming first, second and third digital arrays representative of said first, second and third signals, respectively;
    all said digital arrays having a length greater than 2;
    a first digital array which is representative of said first signal having a length $n$ which is an even number;
    means for dividing said first digital array onto two equal halves;
    means for individually summing said two equal halves separately;
    means for deriving a first error signal which is representative of the difference between the sums of said two equal halves;
    thereby forming a range error signal.

2. The radar tracking system of claim 1 wherein said second digital array, which is representative of said second signal, is summed thereby forming an azimuth error signal to control said antenna.

3. The radar tracking system of claim 1 wherein said third digital array, which is representative of said third signal, is summed thereby forming an elevation error signal to control said antenna.

4. The radar tracking system of claim 1 wherein the two equal halves of said first digital array are summed thereby forming an AGC signal proportional to the average amplitude of said first signal.

* * * * *